United States Patent [19]
Hashimoto et al.

[11] Patent Number: 5,059,468
[45] Date of Patent: Oct. 22, 1991

[54] MAGNETIC RECORDING MEDIUM

[75] Inventors: Morimi Hashimoto, Wakoh; Tokio Matsumoto, Kawasaki; Takayuki Yagi, Tokyo; Kenji Suzuki; Hiroshi Takagi, both of Yokohama, all of Japan

[73] Assignee: Canon Kabushiki Kaisha, Tokyo, Japan

[21] Appl. No.: 662,971

[22] Filed: Feb. 28, 1991

Related U.S. Application Data

[63] Continuation of Ser. No. 287,530, Dec. 19, 1988, abandoned, which is a continuation of Ser. No. 32,332, Mar. 30, 1987, abandoned.

[30] Foreign Application Priority Data

Mar. 29, 1986 [JP] Japan ............................. 61-069756

[51] Int. Cl.$^5$ ............................................. G11B 23/00
[52] U.S. Cl. .................................... 428/141; 428/332; 428/421; 428/422; 428/473.5; 428/694; 428/695; 428/900
[58] Field of Search ................ 428/141, 329, 332, 421, 428/422, 473.5, 694, 900, 695; 427/131, 132

[56] References Cited

U.S. PATENT DOCUMENTS

| 4,495,242 | 1/1985 | Arai | 428/900 |
|---|---|---|---|
| 4,529,651 | 7/1985 | Kitoo | 428/422 |
| 4,554,217 | 11/1985 | Grimm | 428/695 |
| 4,565,734 | 1/1986 | Arai | 428/695 |
| 4,581,245 | 4/1986 | Nakamura | 427/132 |
| 4,582,746 | 4/1986 | Shirahata | 428/900 |
| 4,631,202 | 12/1986 | Opfer | 428/900 |
| 4,645,702 | 2/1987 | Asakura et al. | 428/141 |
| 4,673,612 | 6/1987 | Takagi | 428/900 |
| 4,696,845 | 9/1987 | Yanagisawa | 428/65 |
| 4,713,287 | 12/1987 | Nishikawa | 428/421 |
| 4,725,482 | 2/1988 | Komoda | 428/900 |
| 4,729,924 | 3/1988 | Skorjanec | 427/131 |
| 4,743,487 | 5/1988 | Saito et al. | 428/141 |

FOREIGN PATENT DOCUMENTS

| 0113416 | 7/1982 | Japan | 428/900 |
|---|---|---|---|
| 0201221 | 11/1984 | Japan | 428/695 |

Primary Examiner—Paul J. Thibodeau
Attorney, Agent, or Firm—Fitzpatrick, Cella, Harper & Scinto

[57] ABSTRACT

A magnetic recording medium is formed by disposing on a substrate a magnetic recording layer of a Co-Cr alloy. The durability and the environmental resistance of the magnetic recording medium are improved by forming protective layers including a layer of cobalt oxide and a layer of fluorine-containing resin disposed thereon, on the magnetic layer.

7 Claims, 1 Drawing Sheet

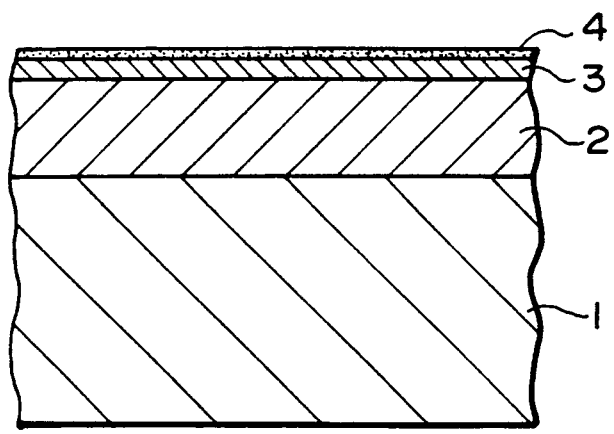

MAGNETIC RECORDING MEDIUM

This applications is a continuation of application Ser. No. 287,530 filed Dec. 19, 1988, now abandoned, which is a continuation of application Ser. No. 032,332, filed Mar. 30, 1987, now abandoned.

FIELD OF THE INVENTION AND RELATED ART

The present invention relates to a vapor deposition or deposited film-type magnetic recording medium for high density recording, excellent in durability and environmental resistance.

Conventionally, so-called "coating-type" magnetic recording media comprising a non-magnetic substrate ordinarily of a plastic film such as polyester, and a magnetic coating layer wherein ferromagnetic fine powder is uniformly dispersed in a polymer binder, disposed on the substrate, have been widely used.

Recently, ferromagnetic thin film-type magnetic recording media have been developed which comprise a thin film of metal, etc., formed on a non-magnetic substrate by vacuum evaporation, sputtering, etc. Some of these thin film-type media have been practically used.

In the ferromagnetic film-type magnetic recording media, one having a magnetic layer comprising a vertically magnetizable film of a Co-Cr alloy is recognized to be particularly promising as a medium for high-density recording, and attracts much attention.

In the conventional coating-type medium, a diamagnetic field has considerable effect during recording or reproduction in a high frequency (a short wavelength) region since the magnetic layer thereof has a relatively large thickness. Therefore, it is required to decrease the thickness of the magnetic layer, or to increase the coercive force Hc thereof, in order to increase a reproduction output in the short wavelength region.

For example, in a medium having a coating layer containing metallic powder (hereinafter simply referred to as "MP medium"), the coercive force thereof is 1300-1500 Oe. As a result, a sufficient recording cannot be effected by using a conventional ferrite magnetic head, and it is required to use an expensive Sendust or amorphous head for recording on the above MP medium. Further, in a case where the thickness of the magnetic layer is decreased, a reproduction output in a long-wavelength region is decreased although that in the short-wavelength region is improved.

Further, there is an essential defect in the coating-type medium that it inherently involves a certain limit in increasing the magnetic flux because it uses magnetic powder dispersed in a polymer binder. As a result, a marked increase in output is difficult to obtain in the conventional coating type medium.

On the other hand, a magnetic tape having a Co-Ni alloy film formed on a substrate, a representative of the vapor-deposition type magnetic tapes, having a magnetic layer of thin metal film, involves problems for practical use in respect of corrosion resistance and durability. More specifically, a Co-Ni alloy itself is not a corrosion-resistance alloy, and a film thereof sometimes has a lower density when it is formed by the oblique vapor deposition method with the purpose of improving magnetic characteristics thereof, so that the resultant Co-Ni film is liable to be oxidized.

In an attempt of improving the corrosion resistance or durability of the Co-Ni film, there have been proposed various methods including: oxidation of the surface of Co-Ni alloy film in a magnetic tape (Japanese Laid-Open Application No. 85403/1978, etc.); provision of a protective layer of oxides or nitrides (Japanese Laid-Open Application No. 167134/1982, etc.); or coating of a corrosion inhibitor (Japanese Laid-Open Application No. 152518/1982, etc.).

However, according to these conventional methods, sufficient corrosion resistance cannot be ensured because the thickness of the Co-Ni film itself is too small and the density thereof is too low.

SUMMARY OF THE INVENTION

It is an object of the present invention to provide a magnetic recording medium in which the aforesaid problems found in the prior art are eliminated and which has excellent recording- and reproduction characteristics and sufficient performance in both durability and corrosion resistance in practical use.

According to the present invention, there is provided a magnetic recording medium comprising: a substrate, a magnetic layer of a Co-Cr alloy, a layer of cobalt oxide, and an organic protective layer, disposed in that order on the substrate; wherein the organic protective layer comprises a fluorine-containing resin.

BRIEF DESCRIPTION OF THE DRAWINGS

The sole figure is a partial sectional view of an embodiment of the magnetic recording medium according to the present invention.

DETAILED DESCRIPTION OF THE INVENTION

The sole figure shows a magnetic recording medium, comprising: a substrate 1, a magnetic layer 2 of a Co-Cr alloy, a layer 3 of cobalt oxide, and an organic protective layer 4, disposed in that order on the substrate.

As the substrate 1 for the magnetic recording medium according to the present invention, there may be used a sheet or film comprising: glass, aluminum, surface-oxidized aluminum, etc. In addition, the substrate may also comprise a polymer such as polyester, cellulose, acrylic resin, polyamide, polyimide, polyamide-imide, polyolefin, poly(polyfluoro-olefin), polyvinyl chloride, polyvinyl acetate, vinyl chloride/vinyl acetate copolymer, polyvinylidene chloride, polycarbonate, phenolic resin, polyether sulfone, polyether-etherketone, polyacetal, polyphenylene oxide, and polyphenylene sulfide.

The thickness of the substrate 1 should preferably be about 4 to 100 μ.

In order to obtain a magnetic recording medium excellent in electro-magnetic conversion characteristic, the coercive force of the magnetic layer should preferably be increased. Further, in order to increase the coercive force of a Co-Cr alloy film as a magnetic layer, it is desired to form the Co-Cr alloy film at a high temperature, more specifically, at a temperature preferably of 100 to 300° C. Accordingly, the above polymer substrate should preferably comprise heat-resistant polyamide or polyimide resin, preferably aromatic polyimide resin.

Further, in a floppy disk or a magnetic tape using such a polymer substrate, prevention of generation of curl thereof is important in view of improved running performance and head touch. In order to provide a recording medium free from generation of curl, it is preferred to select the thermal expansion coefficient of the polymer substrate under optimum conditions so that a stress generated during formation of the Co-Cr alloy film can be compensated.

The substrate or base film to be preferably used in the magnetic recording medium of the present invention is an aromatic polyimide film obtained by film formation and imidation thereof. The film before imidation is prepared from a solution of an aromatic polyamic acid obtained by copolymerization by use of p-phenylenediamine (PPD) alone or both PPD and diaminodiphenyl ether (DADE) as the diamine component, and also by use of both biphenyltetracarboxylic acid dianhydride (BPDA) and pyromellitic acid dianhydride (PMDA) as the tetracarboxylic acid components.

In a case where such an aromatic polyimide film is used as the substrate, even a considerably thin base film having a thickness of about 50 $\mu$ or below, particularly about 10 $\mu$ or below can be used. Therefore, this aromatic polyimide film is most suitably used in a magnetic tape for long-time recording.

Since the base film is formed of the three components of PPD, BPDA and PMDA or the four components of PPD, DADE, BPDA and PMDA through copolymerization, it is not only excellent in heat resistance, tensile modulus, etc., but also the thermal expansion coefficient of the aromatic polyimide film obtained can be made substantially identical with that of the Co-Cr alloy film by variously controlling the ratios of the respective components employed for constituting both the components. Besides, the tensile modulus of the aromatic polyimide film can be varied so as to improve the stiffness, etc., of the film depending on its uses.

In a case where the aromatic polyimide film is used as the base film, the base film thus formed may have a thermal expansion coefficient within the range of from $1.0 \times 10^{-5}$ to $3.0 \times 10^{-5}$ cm/cm/° C., a tensile modulus within the range of from about 300 to 1,200 kg/mm$^2$, particularly from 325 to 700 kg/mm$^2$, and further a second-order transition temperature of about 300° C. or higher, particularly 310° C. or higher. Further, in addition to the properties as mentioned above, those having a thermal decomposition temperature of about 400° C. or higher, particularly 450° C. or higher, being capable of standing continuous use at a temperature around 250° C., and also having a tensile strength of about 20 kg/mm$^2$ or higher, particularly 25 kg/mm$^2$ or higher, and yet an elongation at break of about 30% or more, particularly 40% or more in tensile test, can exhibit excellent heat resistance during manufacturing of magnetic recording media to enable formation of magnetic layers at high temperature, in addition to prevention of generation of curl, and further can give a magnetic recording medium free of winding irregularity and excellent in running performance and head touch.

In the present invention, in order to provide preferable mechanical properties thermal properties, etc., for the magnetic recording medium as described above, the diamine component used for formation of an aromatic polyamic acid should preferably comprise the two components of PPD in a proportion of about 40 to 95 mole %, particularly 45 to 90 mole %, and DADE in a proportion of about 5 to 60 mole %, particularly 10 to 55 mole %, respectively, based on the total diamine component. Further, the tetracarboxylic acid component for formation of an aromatic polyamic acid should preferably comprise BPDA in a proportion of about 10 to 90 mole %, particularly 15 to 85 mole %, and PMDA in a proportion of about 10 to 90 mole %, particularly 15 to 85 mole %, respectively, based on the total tetracarboxylic acid component.

The lubricating effect of the magnetic recording medium depends on the surface unevenness thereof. Therefore, in order to control the surface unevenness of the base film comprising polyimide film etc., fillers such as carbon black, graphite, silica fine powder, magnesia fine powder, titanium oxide, calcium carbonate, etc., may be contained in the film through kneading, as desired. However, in order to make the best use of the excellent high-density recording characteristic of the magnetic recording medium of the present invention, the surface unevenness of the substrate should preferably be 0.05 $\mu$m or below in terms of the maximum roughness Rmax of the surface. If the Rmax exceeds 0.05 $\mu$m, there occurs a drop-off of a signal at that plate. Further, if the surface unevenness of the magnetic recording medium is smaller than 0.005 $\mu$m in terms of an average of ten measured values of surface roughness Rz (JIS-B0601), lubricating effect thereof decreases. Herein, the maximum roughness Rmax is obtained as the maximum difference in height between concavity and convexity in the measurement of the average of ten measured values of surface roughness Rz.

For formation of the magnetic layer of Co-Cr alloy on the aromatic polyimide film as described above, known vapor deposition methods such as the sputtering method, the electron beam continuous vapor deposition method, etc., may be employed, because the temperature of the aromatic polyimide film during formation of the magnetic layer on the surface of the film as mentioned above (vapor deposition temperature) can be elevated to about 250° C., whereby magnetic layers of excellent performance can readily be formed.

A Co-Cr alloy is preferred for the magnetic layer, because it has a vertical magnetic anisotropy in the perpendicular direction to the film surface, and can be formed into a vertically magnetizable film which is not affected by a diamagnetic field in a short wavelength-region recording. Accordingly, it is not required to make the magnetic layer extremely thin, and therefore the magnetic layer is allowed to have a sufficiently large thickness with the purpose of increasing output. Further, since the magnetic layer of Co-Cr alloy can be formed without the oblique vapor deposition, it can form a film of high density, and the decrease in magnetic flux density caused by decreasing the thickness thereof can be minimized. Further, the Co-Cr alloy film is also excellent for the magnetic layer due to considerably strong corrosion resistance thereof.

The Cr content in Co-Cr alloy is preferably 15 to 22 wt. %, more preferably 18 to 20 wt. %.

The preferred thickness of the magnetic layer 2 of this Co-Cr alloy is in the range of 0.1 to 2.0 $\mu$m. The magnetic layer 2 may be formed directly on the substrate 1. Further, before the formation of the magnetic layer 2, the surface of the substrate 1 may be subjected to a pretreatment such as corona discharge treatment, etc., with the purpose of enhancing adhesive or magnetic characteristic, etc., as desired.

Also, the magnetic layer 2 as described above, in place of being formed directly on the substrate 1, may also be provided through an intermediary non-magnetic film such as that of Al, Ti, Cr, Ge, SiO$_2$, Al$_2$O$_3$, etc., or a high permeability film as represented by an Fe-Ni alloy film or amorphous films such as those of Co-Zr, Fe-P-C, Fe-Co-Si-B, etc.

Further, the magnetic layer 2 of the Co-Cr alloy can be formed on both surfaces of the substrate 1, as desired.

The layer 3 of cobalt oxide disposed on the Co-Cr alloy film 2 can be provided as a laminated layer formed by means of deposition on the magnetic layer 2, such as physical vapor deposition processes including sputtering in an inert gas containing oxygen at a prescribed partial pressure, ion plating, vacuum vapor deposition in an atmosphere of dilute or low-pressure oxygen, etc. The layer 3 of cobalt oxide may be also provided as an oxidized layer formed by plasma oxidation of the surface of the magnetic layer 2 of Co-Cr alloy.

In a sputtering process, the cobalt oxide layer may be formed under a total pressure of ordinarily $10^{-4}$ to $10^{-1}$ Torr with a partial oxygen pressure of 5 to 50% against a partial inert gas pressure. In a vacuum vapor deposition or ion plating process, the cobalt oxide layer may be usually formed in a dilute oxygen atmosphere at a pressure of the order of $10^{-3}$ Torr.

Since the cobalt oxide layer 3 will prevent cohesion or agglutination between the magnetic layer 2 and a head material, it can considerably enhance wear resistance of the magnetic layer 2. The cobalt oxide layer 3 is required to have a sufficient thickness for ensuring the wear resistance, whereas the thickness thereof is desired to be small in order to decrease a spacing loss and to effectively utilize the high-density recording characteristic of the Co-Cr alloy magnetic layer 2. Therefore, the thickness of the cobalt oxide layer 3 is preferably 30 to 300 Å, particularly preferably 50 to 150 Å.

The cobalt oxide layer 3 has a marked effect on the protection of the magnetic layer 2, and is suitable for a metal head or a ferrite head, etc., and further a friction coefficient of the surface thereof can be decreased. Particularly, in a case where the surface portion of the cobalt oxide layer is composed of $Co_3O_4$, the above effects are marked.

In a case where the cobalt oxide layer 3 is formed on the magnetic layer 2, if the cobalt oxide layer 3 has an extremely even surface (more specifically, if the average of ten measured values of surface roughness Rz (JIS-B0601) thereof is 0.005 $\mu$ or below), or if a magnetic recording medium having it is used under severe conditions such as a highly humid condition, the durability thereof is not always sufficient.

Therefore, in order to maintain the high-density recording characteristic of the magnetic recording medium, to decrease the friction thereof, and to enhance the running stability thereof, it is extremely effective to form the protective layer 4 comprising a fluorine-containing resin on the cobalt oxide layer 3. Thus, the lubricating effect of the fluorine-containing resin, when combined with the large protective effect of the cobalt oxide layer 3, realizes a combined effect, and hence there can be provided a magnetic recording medium which has a further improved wear resistance, and is excellent in running performances and durability under high temperature-high humidity, or low temperature-high humidity conditions.

The organic protective layer 4 is not necessarily an even and continuous layer, and it may be a discontinuous layer such as one comprising spots of the fluorine-containing resin.

The thickness of the organic protective layer 4 is preferably 200 Å or smaller, more preferably 100 Å or smaller, and is preferably 5 Å or larger, respectively in terms of an average film thickness. The average film thickness, which is used in consideration of the uncontinuous layer, is obtained through dividing the amount of the coating material constituting the organic protective layer 4 by the coated surface area of the cobalt oxide layer 3.

If the above average film thickness of the organic protective layer exceeds 200 Å, a spacing loss in electromagnetic conversion characteristic is liable to occur. On the other hand, if it is below 5 Å, the prescribed effect thereof cannot be obtained.

As the fluorine-containing resin constituting the organic protective layer in the present invention, there may be used, for example, tetrafluoroethylene resin (abbr. "PTFE"), polyvinylidene fluoride resin, polyvinyl fluoride resin, tetrafluoroethylene-hexafluoropropylene copolymer resin, tetrafluoroethyleneethylene copolymer resin, tetrafluoroethylene-perfluoroalkoxyethylene copolymer resin, trifluorochloroethyleneethylene copolymer resin (ECTFE), trifluorochloroethylene resin, etc.

Among these fluorine-containing resins, tetrafluoroethylene-hexafluoropropylene copolymer resin is particularly preferably used. Further, the organic protective layer 4 may comprise a mixture of plural species of the above fluorine-containing resins. Further, the above fluorine-containing resin may be mixed with a fatty acid or its derivative showing excellent durability at a high temperature, such as stearic acid amide, stearic acid monoglyceride and the like.

The protective layer 4 may be preferably formed by dry coating methods including vacuum vapor deposition processes using electron-beam, resistance heating, or ion plating.

In the magnetic recording medium according to the present invention, the magnetic layer is formed on at least one surface of the substrate, while on the reverse surface thereof, as desired, a layer or layers may be disposed in the symmetrical form with respect to those formed on the above-mentioned surface thereof.

Further, on the reverse surface, various back coating layers may be formed with the purpose of providing effects of protection, lubrication, reinforcement, or other desirable effects of the substrate.

Such back coating layers may include: films of metals or semimetals, such as Al, Ti, Zr, Co, Nb, Ta, W, Cr, Si, Ge, etc.; films of oxides, nitrides or carbides of the above metals or semimetals. In addition, the back coating layer may be formed by applying a kneaded mixture wherein at least one of additives such as lubricative fine powder including that of oxides or calcium carbonate, etc., conductive particles including that of carbon, metal powder, etc., and lubricates including fatty acids or fatty acid esters, is dispersed into a polymer binder such as a thermoplastic or thermosetting resin, etc., through kneading.

The magnetic recording medium of the present invention may be in any form of a disk, sheet, tape or card.

The present invention will now be described in more detail by way of Examples.

Incidentally, the methods of evaluation employed in the following Examples are described hereinbelow.

<EVALUATION OF MAGNETIC TAPE>

Frequency Characteristic in Output

Individual signals having a frequency of 0.75 MHz, 4.5 MHz, and 7.5 MHz, respectively, were recorded on a tape, and thereafter reproduction output were respectively measured.

Durability Test in Still Reproduction

A change in still reproduction output with the elapse of time was measured under the conditions of 20° C.-65% humidity, and 0° C. In a case where the decrease in the output after 20 minutes counted from the initiation of the still reproduction was 3 dB or smaller, a symbol ◯ is given in the Tables hereinafter.

Corrosion Resistance

After a magnetic tape was left standing for 1,000 hours under the conditions of 50° C.-80% humidity, a decrease in the saturated magnetic flux density of the tape was measured. In a case where the decrease was 10% or below of the initial value, a symbol ◯ is given in the Tables hereinbelow. On the other hand, in a case where the decrease exceeded 10%, a symbol ✕ is given in the Tables.

<EVALUATION OF MAGNETIC DISK>

Frequency Characteristic in Output

Individual signals having a frequency of 1.3 MHz and 7.0 MHz, respectively, were recorded on a magnetic disk, and thereafter reproduction output were respectively measured.

Durability Test

A change in still reproduction output with the elapse of time was measured under the conditions of 20° C.-65% humidity 65%. In a case where the decrease in the output after 50 hours counted from the initiation of the still reproduction was 3 dB or smaller, a symbol ◯ is given in the Tables hereinafter.

Fluctuation in Output

Signals having a frequency of 1.3 MHz and 7.0 MHz, respectively, were recorded on a magnetic disk, and thereafter the difference between the maximum and minimum output in one track of a magnetic disk was measured.

EXAMPLE 1

A polymerization vessel with an inner volume of 300 liter was charged with 20 moles of 3,3',4,4'-biphenyltetracarboxylic acid dianhydride, 80 moles of pyromellitic acid dianhydride, 70 moles of p-phenylenediamine and 30 moles of 4,4'-diaminodiphenylether, and further with 198.0 kg of N-methyl-2-pyrrolidone. Polymerization reaction was carried out by stirring the mixture at a reaction temperature of 50° C. under normal pressure for 44 hours, to obtain a reaction mixture containing about 20.0% by weight of an aromatic polyamic acid with a high molecular weight.

The solution composition of the aromatic polyamic acid was cast on a casting roller to form a liquid film of the solution composition having a uniform thickness, which liquid film was dried and solidified while elevating the temperature from about 60 to 200° C. Further, the solidified film was peeled off from the casting roller and subjected to heat treatment in a furnace by heating up to 350° C. to form an aromatic polyimide base film with a thickness of 10 $\mu$.

For this aromatic polyimide film, various physical properties were measured. As the result, the polyimide film exhibited a tensile modulus of 490 kg/mm$^2$, a thermal expansion coefficient $\alpha$ (100–300° C.) of $1.6 \times 10^{-5}$ cm/cm/° C. within a temperature range of 100 to 300° C., and an average of ten measured values of surface roughness Rz of 80 Å.

By use of the above aromatic polyimide film as a base film and an alloy target comprising 78 wt. % Co and 22 wt. % Cr, by means of a successive vapor-deposition apparatus for producing a magnetic tape having an electron-beam heating device, according to the vapor deposition method in which the film formation speed of the magnetic layer was controlled at 0.1 $\mu$m/sec and the temperature of the base film was controlled at 230° C., a vertically magnetizable film of the above magnetic material was formed on the above base film to a thickness of about 0.4 $\mu$m.

Thereafter, by use of a Co target, in an atmosphere of Ar gas containing 10% of oxygen, according to the sputtering method, a cobalt oxide film having a thickness of 0.01 $\mu$m was formed on the above magnetic layer.

Further, by use of a target comprising a tetrafluoroethylene resin (trade name: TEFLON 7A-J, mfd. by Du Pont), according to the vapor deposition method in which the temperature of the target was slowly elevated by a electron-beam heating device, and the film formation speed of the fluorine-containing resin layer was controlled at 20 Å/sec, a film of the above tetrafluoroethylene resin was formed on the above cobalt oxide layer to an average film thickness of 30 Å, thereby to form a magnetic sheet.

The thus prepared magnetic sheet was slit into a tape form having a width of 8.0 mm thereby to prepare a magnetic tape according to the present invention. The degree of curl of thus prepared magnetic tape was smaller than 0.1 mm$^{-1}$ in terms of 1/r, the reciprocal of radius of curvature, which was a value causing no problem in a practical use.

The above magnetic tape was disposed in a cassette for a 8 mm-VRT tape, and frequency characteristic in output, durability in still reproduction, and corrosion resistance (50° C.-80% humidity) tests were respectively performed by use of an 8 mm video deck.

The results of the tests were good as shown in Table 1 hereinbelow.

EXAMPLE 2

A solution composition of an aromatic polyamic acid was prepared in the same manner as in Example 1 except for using a monomer composition comprising 40 moles of 3,3',4,4'-biphenyltetracarboxylic acid dianhydride, 60 moles of pyromellitic acid dianhydride, 50 moles of p-phenylenediamine and 50 moles of 4,4'-diaminodiphenylether.

An aromatic polyimide film having a thickness of 40 $\mu$m was prepared in the same manner as in Example 1 except that the above prepared solution composition was used.

The thus prepared polyimide film exhibited a tensile modulus of 400 kg/mm$^2$, a thermal expansion coefficient $\alpha$ (100–300° C.) of $2.6 \times 10^5$ cm/cm/° C. within a temperature range of 100 to 300° C., and an average surface roughness Rz of 30 Å.

By use of the above aromatic polyimide film as a base film and an alloy target comprising 80 wt. % Co and 20 wt. % Cr, by means of a sputtering apparatus, according to the sputtering method, in which the temperature of the base film was controlled at 150° C., a vertically magnetizable film of the above magnetic material was formed on the base film to a thickness of about 0.5 μm. Thereafter, a cobalt oxide layer having a thickness of 80 Å was formed on the above magnetic layer by use of a Co target, according to the sputtering method in an atmosphere of Ar gas containing 12% of oxygen.

Further, by use of a boat containing tetrafluoroethylene resin (trade name: RUBRON L-5F, a low-molecular weight PTFE mfd. by Daikin Kogyo K.K.) as an evaporation source heated up to 600° C. by resistance heating, according to the vacuum vapor deposition method in which the film formation speed was controlled at 50 Å/sec, a protective layer of the tetrafluoroethylene resin was formed on the above cobalt oxide layer to an average film thickness of 30 Å thereby to form a magnetic sheet.

The thus formes sample (the magnetic sheet) was stamped into a disk form having a diameter of 47 mmφ, thereby to obtain a magnetic disk according to the invention. This magnetic disk was evaluated by use of a still video deck (an apparatus for tests).

The results were good as shown in Table 2 hereinafter.

EXAMPLE 3

An aromatic polyimide film, a vertically magnetizable vapor deposition film, and a cobalt oxide layer were respectively formed in the same way as in Example 1.

Thereafter, by use of a target comprising a polyvinylidene fluoride regin (abbr. "PVDF", trade name: KF polymer mfd. by Kureha Kagaku Kogyo K.K.), according to the vapor deposition method in which the temperature of the target was slowly elevated by an electron-beam heating device, and the film formation speed of the fluorine-containing resin layer was controlled at 30 Å/sec, a film of the above PVDF resin was formed on the above cobalt oxide layer to an average film thickness of 30 Å thereby to prepare a magnetic sheet.

The thus prepared magnetic sheet was slit into a tape form having a width of 8.0 mm thereby to prepare a magnetic tape according to the invention. The degree of curl of thus prepared magnetic tape was smaller than 0.1 mm$^{-1}$ in terms of 1/r, which was a value causing no problem in a practical use.

The above magnetic tape was disposed in a cassette for a 8 mm-VTR tape, and evaluations of this tape were performed by use of an 8 mm video deck in the same way as in Example 1.

The results were considerably good as shown in Table 1 hereinbelow.

EXAMPLE 4

An aromatic polyimide film, a vertically magnetizable Co-Cr film, and a cobalt oxide layer were respectively formed in the same way as in Example 2.

Thereafter, by use of a target comprising a polyvinyl fluoride resin (abbr. "PVF", trade name: TEDLAR mfd. by Du Point), according to the vapor deposition method in which the temperature of the target was slowly elevated to fuse the resin by a electron-beam heating device, and the film formation speed of the fluorine-containing resin layer was controlled at 30 Å/sec, a protective film of the above PVD resin was formed on the above cobalt oxide layer to an average film thickness of 0.005 μm thereby to prepare a magnetic sheet.

The thus prepared sample (the magnetic sheet) was stamped into a disk form having a diameter of 47 mmφ, thereby to obtain a magnetic disk according to the invention. This magnetic disk was evaluated by use of a still video deck (an apparatus for tests).

The results were good as shown in Table 2 hereinbelow.

EXAMPLE 5

An aromatic polyimide film, a vertically magnetizable vapor deposition film, and a cobalt oxide layer were respectively formed in the same way as in Example 1.

Thereafter, by use of a traget comprising a tetrafluoroethylene-hexafluoropropylene copolymer resin (abbr. "FEP", trade name: TEFLON-100 mfd. by Du Pont), according to the vapor deposition method in which the temperature of the target was slowly elevated to fuse the resin by a electron-beam heating device, and the film formation speed of the fluorine-containing resin layer was controlled at 10 Å/sec, a film of the above FEP resin was formed on the above cobalt oxide layer to an average film thickness of 0.003 μm thereby to prepare a magnetic sheet.

The thus prepared magnetic sheet was slit into a tape form having a width of 8.0 mm thereby to prepare a magnetic tape according to the invention. The degree of curl of thus prepared magnetic tape was smaller than 0.1 mm$^{-1}$ in terms of 1/r, which was a value causing no problem in a practical use.

The above magnetic tape was disposed in a cassette for a 8 mm-VRT tape, and evaluations of the tape were performed by use of an 8 mm video deck in the same way as in Example 1.

The results were considerably good as shown in Table 1 hereinbelow.

EXAMPLE 6

An aromatic polyimide film having a thickness of 40 μm, a vertically magnetizable vapor deposition film, and a cobalt oxide layer were respectively formed in the same way as in Example 2.

Thereafter, by use of a target comprising a tetrafluoroethylene-ethylene copolymer resin (abbr. "ETFT", trade name: TEFZEL mfd. by Du Pont), according to the vapor deposition method in which the temperature of the target was slowly elevated to fuse the resin by a electron-beam heating device, and the film formation speed of the fluorine-containing resin layer was controlled at 30 Å/sec, a film of the above ETFE resin was formed on the above cobalt oxide layer to an average film thickness of 50 Å thereby to prepare a magnetic sheet.

The thus prepared sample (the magnetic sheet) was stamped into a disk form having a diameter of 47 mmφ, and was evaluated by use of a still video deck (an apparatus for tests).

The results were good as shown in Table 2 hereinbelow.

EXAMPLE 7

An aromatic polyimide film, a vertically magnetizable vapor deposition film, and a cobalt oxide layer were respectively formed in the same way as in Example 1.

Thereafter, by use of a target comprising a tetrafluoroethylene-perfluoroalkoxyethylene copolymer resin (abbr. "PFA", trade name: TEFLON 340-F mfd.

by Du Pont), according to the vapor deposition method in which the temperature of the target was slowly elevated by a electron-beam heating device, and the film formation speed of the fluorine-containing resin layer was controlled at 30 Å/sec, a film of the above PFA resin was formed on the above cobalt oxide layer to an average film thickness of 0.003 μm thereby to prepare a magnetic sheet.

The thus prepared magnetic sheet was slit into a tape form having a width of 8.0 mm thereby to prepare a magnetic tape. The degree of curl of thus prepared magnetic tape was smaller than 0.1 mm$^{-1}$ in terms of 1/r, which is a value causing no problem in a practical use.

The above magnetic tape was disposed in a cassette for an 8 mm-VTR tape, and evaluations of this tape were performed by use of an 8 mm video deck in the same way as in Example 1.

The results were considerably good as shown in Table 1 hereinbelow.

Comparative Example 1

A magnetic layer having a composition of Co 80 wt. %–Ni 20 wt. % was formed in a thickness of 0.12 μm on a polyester film having a thickness of 11 μm by oblique vapor deposition. Thereafter, a layer comprising a PTFE resin in a thickness of 0.003 μm was formed on this magnetic layer in the same manner as in Example 1, thereby to prepare an 8 mm-video tape.

The reproduction output characteristic, and the durability of this magnetic tape were satisfactory, but the decrease in a saturated magnetic flux density undesirably exceeded 10%, thus showing a poor corrosion resistance.

Comparative Example 2

By use of a commercially available powder-coating type floppy disk, reproduction output, durability and fluctuation in output were measured.

This metal powder-coating type floppy disk was one prepared by applying a coating composition which comprised magnetic fine powder of Co-containing γ-Fe$_2$O$_3$ type magnetic material dispersed in a thermosetting binder resin on a substrate of polyethylene terephthalate having a thickness of 40 μm.

This thermosetting binder resin was one of polyurethane-nitrocellulose type containing very small amounts of additives such as dispersant, antistatic agent, lubricant, abrasive, plasticizer, etc. Further, in the magnetic layer of this floppy disk, the ratio of inorganic components (magnetic powder, antistatic agent, and abrasive) to organic components (binder resin, curing agent, dispersant, lubricant, and plasticizer) was about 8 to 2.

As a result of measurement, both reproduction output and durability were satisfactory, but the fluctuation in output was undesirably about 2 dB.

The above described results of evaluation are summarized in the following Tables 1 and 2.

TABLE 1

| Example | Structure of protective layers | | Reproduction output | | | Durability | | Corrosion resistance |
|---|---|---|---|---|---|---|---|---|
| | | | 0.75 MHz | 4.5 MHz | 7.5 MHz | 20° C. | 0° C. | |
| 1 | (Upper layer) PTFT "Teflon 7 A-J" | 30 Å | +4 dB | +2 dB | +3 dB | ○ | ○ | ○ |
| | (lower layer) cobalt oxide film | 100 Å | | | | | | |
| 3 | (Upper layer) PVDF | 30 Å | +4 dB | +2 dB | +3 dB | ○ | ○ | ○ |
| | (Lower layer) cobalt oxide film | 100 Å | | | | | | |
| 5 | (Upper layer) FEP | 30 Å | +4 dB | +2 dB | +3 dB | ○ | ○ | ○ |
| | (Lower layer) cobalt oxide film | 100 Å | | | | | | |
| 7 | (Upper layer) PFA | 30 Å | +4 dB | +2 dB | +3 dB | ○ | ○ | ○ |
| | (Lower layer) cobalt oxide film | 100 Å | | | | | | |

TABLE 2

| Example | Structure of protective layer | | Reproduction output | | Durability | Fluctuation in output |
|---|---|---|---|---|---|---|
| | | | 1.3 MHz | 7 MHz | 20° C. | |
| 2 | (Upper layer) low molecular-weight PTFE "Lubron L-5F" | 50 Å | 0 dB | +5 dB | ○ | 0 dB |
| | (Lower layer) cobalt oxide film | 80 Å | | | | |
| 4 | (Upper layer) PVF | 50 Å | 0 dB | +5 dB | ○ | 0 dB |
| | (Lower layer) cobalt oxide film | 80 Å | | | | |
| 6 | (Upper layer) ETFE | 50 Å | 0 dB | +5 dB | ○ | 0 dB |
| | (Lower layer) cobalt oxide film | 80 Å | | | | |

As described hereinabove, in the magnetic recording medium according to the present invention, the magnetic layer comprises a Co-Cr alloy, whereby the magnetic layer becomes a vertically magnetizable film capable of high density recording. Further, since the Co-Cr alloy is excellent in corrosion resistance, and further, a cobalt oxide layer is disposed on the Co-Cr alloy magnetic layer, the magnetic recording medium of the present invention has a further improved corrosion resistance. Furthermore, the magnetic recording medium of the invention wherein a protective layer comprising a fluorine-containing resin is disposed on the above cobalt oxide layer, is excellent in running performances and durability. As a result, the magnetic recording medium according to the present invention which comprises the above Co-Cr alloy magnetic layer, the cobalt oxide layer, and the protective layer of the fluorine-containing resin, disposed in that order on the substrate, is excellent in all of the high density recording characteristic, wear resistance, durability, and environmental resistance.

What is claimed is:

1. A magnetic recording medium comprising:

a substrate having a thermal expansion coefficient from $1.0 \times 10^{-5}$ to $3.0 \times 10^{-5}$ cm/cm/° C. and a tensile modulus from about 300 to 1,200 Kg/mm$^2$;

a magnetic layer of a Co-Cr alloy;

a layer of cobalt oxide; and a 5 to 200 Å thick organic protective layer comprising a fluorine-containing resin formed by electron-beam or resistance-heating vapor deposition, said fluorine containing resin being selected from the group consisting of polytetrafluoreothylene-hexafluoropropylene copolymer, polytetrafluoroethylene, polyvinylidene fluoride, polyvinyl fluoride and polytetafluoroethylene-perfluoroalkoxyethylene copolymer resins disposed in that order on the substrate, wherein said magnetic recording medium has a surface roughness of at least 0.005 μm in terms of an average of ten measured values of surface roughness $R_z$.

2. A magnetic recording medium according to claim 1, wherein said magnetic layer of the Co-Cr alloy has a thickness of 0.1 to 2.0 μ.

3. A magnetic recording medium according to claim 1, wherein said layer of cobalt oxide is formed by oxidizing the surface of the magnetic layer of the Co-Cr alloy.

4. A magnetic recording medium according to claim 1, wherein said layer of cobalt oxide has a thickness of 30 to 300 Å.

5. A magnetic recording medium according to claim 4, wherein said layer of cobalt oxide has a thickness of 50 to 150 Å.

6. A magnetic recording medium according to claim 1, wherein said organic protective layer has a thickness of 5 to 100 Å.

7. A magnetic recording medium according to claim 1, wherein layers of the Co-Cr alloy are formed on both surfaces of said substrate.

* * * * *

UNITED STATES PATENT AND TRADEMARK OFFICE
CERTIFICATE OF CORRECTION

PATENT NO. : 5,059,468                      Page 1 of 2

DATED : October 22, 1991

INVENTOR(S) : MORIMI HASHIMOTO, ET AL.

It is certified that error appears in the above-identified patent and that said Letters Patent is hereby corrected as shown below:

COLUMN 1

Line 4, "applications" should read --application--.

COLUMN 3

Line 56, "properties thermal" should read
         --properties and thermal--.

COLUMN 5

Line 68, "uncon-" should read --discon- --.

COLUMN 6

Line 15, "tetrafluoroethyleneethylene" should read
         --tetrafluoroethylene-ethylene--.
    Line 52, "lubricates" should read --lubricants--.

COLUMN 7

Line 1, "output" should read --outputs--.
    Line 10, "symbol O" should read --symbol o--.
    Line 17, "symbol O" should read --symbol o--.
    Line 26, "output" should read --outputs--.
    Line 34, "symbol O" should read --symbol o--.
    Line 48, "p-phenylenediamine" should read
         --p-phenylene-diamine--.

UNITED STATES PATENT AND TRADEMARK OFFICE
CERTIFICATE OF CORRECTION

PATENT NO. : 5,059,468

DATED : October 22, 1991

INVENTOR(S) : MORIMI HASHIMOTO, ET AL.

Page 2 of 2

It is certified that error appears in the above-identified patent and that said Letters Patent is hereby corrected as shown below:

COLUMN 9

Line 16, "formes" should read --formed--.

COLUMN 10

Line 14, "traget" should read --target--.

COLUMN 13

Line 4, "1,200 Kg/mm$^{2:}$" should read --1,200 Kg/mm$^2$;--.
Line 7, "200 A" should read --200 Å--.
Line 10, "fluorine containing" should read --fluorine-containing--.
Line 11, "polytetrafluoreothylene" should read --polytetrafluoroethylene--.
Line 15, "polytetafluoroethylene" should read --polytetrafluoroethylene--.

Signed and Sealed this

Twenty-third Day of March, 1993

Attest:

STEPHEN G. KUNIN

Attesting Officer

Acting Commissioner of Patents and Trademarks